(No Model.)
J. A. COOK.
TELESCOPIC RULE.
No. 450,141.  Patented Apr. 14, 1891.
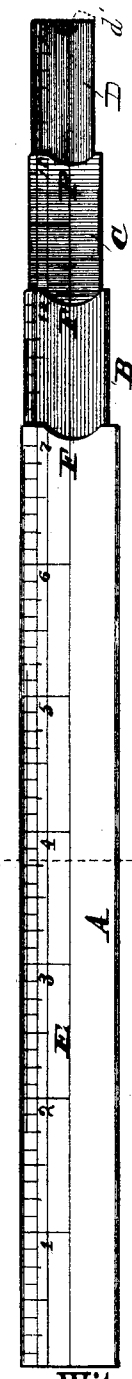
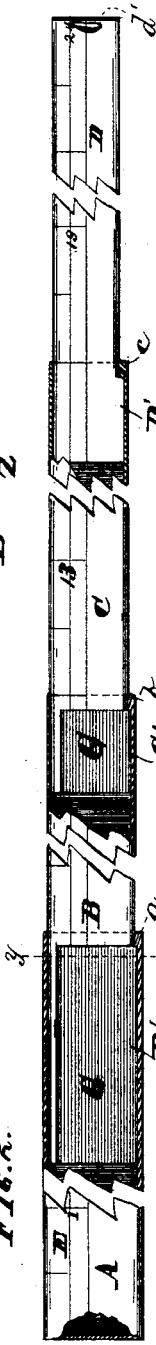
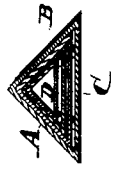
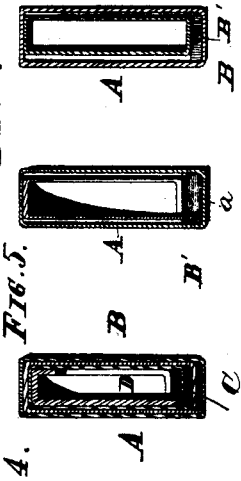
Witnesses:
A. Stark
Centie S. Stark
Inventor:
John A. Cook
by Michael J. Stark & Wm O Stark
Attorneys.

UNITED STATES PATENT OFFICE.

JOHN A. COOK, OF BUFFALO, NEW YORK.

TELESCOPIC RULE.

SPECIFICATION forming part of Letters Patent No. 450,141, dated April 14, 1891.

Application filed December 18, 1890. Serial No. 375,090. (No model.)

*To all whom it may concern:*

Be it known that I, JOHN A. COOK, of Buffalo, in the county of Erie and State of New York, have invented certain new and useful Improvements on Telescopic Rules; and I do hereby declare that the following description of my said invention, taken in connection with the accompanying sheet of drawings, forms a full, clear, and exact specification, which will enable others skilled in the art to which it appertains to make and use the same.

This invention has general reference to improvements in telescopic rules; and it consists, essentially, in the novel and peculiar combination of parts and details of construction, as hereinafter first fully set forth and described, and then pointed out in the claims.

In the drawings already referred to, which serve to illustrate my said invention more fully, Figure 1 is a plan of my improved telescopic rule. Fig. 2 is a plan of the same, partly in section, showing internal details of construction. Fig. 3 is a similar view of the outer casing of the rule and one of its sections. Fig. 4 is a transverse sectional elevation in line $x\ x$ of Fig. 1. Fig. 5 is a similar view in line $y\ y$ of Fig. 2. Fig. 6 is a similar view in line $z\ z$ of Fig. 3. Figs. 7 and 8 are transverse sectional views of modified forms of my device.

Like parts are designated by corresponding letters of reference in all the figures.

The object of this invention is the production of an efficient telescopic rule for mechanics and others' use which shall be simple in construction, not likely to get out order, and easily extended for use. To attain these results I construct this telescopic rule of an outer casing A, of any suitable length, and of an inner series of sheaths B C and a final bar D, all as clearly shown in Fig. 1. In the interior of the outer casing A, which is a thin shell of proper width and thickness, I place a bottom A', so as to close one end thereof, and near the opposite open end I provide a stop or inwardly-pointing projection $a$, Figs. 2 and 3, to reduce this end of the casing A to the outer dimensions of the sheathing B. This sheathing B has on one end a lateral projection B' of proper length, (see Figs. 2, 3, 6, and 7,) whereby its width is increased to the interior size of the sheathing A, so as to fit the same with a nice sliding fit, while said projection at the same time forms a stop to engage the inner stop $a$ of the outer casing A, and thereby prevent the entire withdrawal of the sheathing B from the outer casing A.

In the forward end of the sheathing B there is a stop $b$, and in the interior of the sheathing C there is a like stop $c$, while on the opposite ends of the sheathings C and the final bar D there are lateral projections C' D', respectively, to prevent the entire withdrawal of the parts from their respective sheathings, as heretofore described. The final bar D is a plain blade of proper material having on one end the lateral projection D', already mentioned, and on the opposite end in its face an indentation $d'$, by means of which it may be pulled outwardly by the person desiring to use the rule.

Along one or both edges and on one or both sides of the outer case, as well as the inner sheathings and the final bar, are provided the usual graduations E of the inches and fractions of inches in any desired manner.

In the open end of the outer casing A and the corresponding ends of the sheathings B and C there are notches F to enable a person to reach the final bar D in an obvious manner.

The outer casing and the sheathings may be formed of sheet metal or of paper, papier-maché, wood pulp, &c., properly saturated with varnish or other substance to render the same impervious to water and strengthen the same. When made of metal the projections B' and C' may be formed of pieces of wire soldered to the edges of the respective sheathing near the end thereof, or they may be produced by cutting out a portion of the side of the sheathing, as illustrated in Fig. 2 at G, and by downwardly bending a portion of this side to form the lateral projections B' C', respectively, which construction, as well as others of a similar nature, would be an equivalent of my construction and within the scope of my present invention.

As a suitable material for the casing as well as for the sheathings I may mention steel-drawn tubing or tubing made of aluminum or the alloys of aluminum with other metals, which, being very strong and ductile, is at the same time extremely light and therefore most desirable for a rule intended to be carried in a person's pocket.

It is evident that the rule may be composed of a larger or smaller number of sections. For instance, a foot-rule may be composed of two, three, or four sections, while a two-foot rule may be constructed of a larger number of sections at the option of the manufacturer. In the present case I have illustrated a two-foot rule composed of four sections, all supposed to be seven inches in length, the sheathing B drawing out of the casing A five inches and the sheathing C and the final bar D drawing out six inches each. By thus drawing the sheathing B but five inches out of the casing A it remains two inches within the casing A, thereby steadying it most at the end, where such support in the casing is required.

In the manufacture of this telescopic rule the section D is placed into C; D C into B, and D C B into A, and, finally, the cap A' put onto the casing A to prevent the sections from falling out of the said casing.

In Figs. 4, 5, and 6 the sheathings are shown proportionately wider than what they will be when practically carried out, this having been thus illustrated to render the construction perfectly clear, it being understood that they are to be made as thin as possible, the actual thickness depending upon the thickness of the final bar D and the thickness of the metal employed in the production of the sheathings.

Instead of forming the sheathings as described, they may be composed of triangular sections, as illustrated in Fig. 8, or of circular cylindrical shells, as shown in Fig. 7, this triangular form being preferable in most cases except for measuring the depth of holes, in which case a circular cylindrical rule can be advantageously employed.

Having thus fully described my invention, I claim as new and desire to secure to me by Letters Patent of the United States—

1. A mechanics' rule composed of sections of different widths and thicknesses, the final one of which is a blade and the remaining ones being sheaths one over the other, each having a stop engaging the next succeeding section, as and for the object stated.

2. A telescopic rule consisting, essentially, of an outer casing having a bottom on one end and an interior stop at the other open end and a series of sheaths one within the other, each of which (except the innermost one) having on one end a stop and at the other end a cut-out provided with a downwardly-pending projection adapted to engage the said stop, as and for the object stated.

In testimony that I claim the foregoing as my invention I have hereto set my hand in the presence of two subscribing witnesses.

JOHN A. COOK.

Attest:
MICHAEL J. STARK,
WM. O. STARK.